United States Patent
Herz et al.

(10) Patent No.: US 9,727,400 B2
(45) Date of Patent: Aug. 8, 2017

(54) METHOD AND SYSTEM FOR TIMEOUT MONITORING

(71) Applicant: Infineon Technologies AG, Neubiberg (DE)

(72) Inventors: Karl Herz, Munich (DE); Ljudmil Anastasov, Munich (DE); Harald Zweck, Munich (DE)

(73) Assignee: Infineon Technologies Ag, Neubiberg (DE)

( * ) Notice: Subject to any disclaimer, the term of this patent is extended or adjusted under 35 U.S.C. 154(b) by 0 days.

(21) Appl. No.: 14/881,496

(22) Filed: Oct. 13, 2015

(65) Prior Publication Data
US 2016/0041862 A1 Feb. 11, 2016

Related U.S. Application Data

(62) Division of application No. 13/422,568, filed on Mar. 16, 2012, now Pat. No. 9,201,719.

(51) Int. Cl.
| | |
|---|---|
| *G01R 31/08* | (2006.01) |
| *G06F 11/07* | (2006.01) |
| *G06F 5/06* | (2006.01) |
| *G06F 5/12* | (2006.01) |
| *G06F 11/30* | (2006.01) |
| *G06F 13/42* | (2006.01) |

(52) U.S. Cl.
CPC .......... *G06F 11/0757* (2013.01); *G06F 5/065* (2013.01); *G06F 5/12* (2013.01); *G06F 11/0745* (2013.01); *G06F 11/3027* (2013.01); *G06F 13/4282* (2013.01)

(58) Field of Classification Search
CPC .......................... H04L 43/50; H04L 12/2697
See application file for complete search history.

(56) References Cited

U.S. PATENT DOCUMENTS

| | | | |
|---|---|---|---|
| 5,797,085 | A | 8/1998 | Beuk et al. |
| 6,922,741 | B2 | 7/2005 | Burton et al. |
| 7,013,336 | B1 | 3/2006 | King |
| 7,600,049 | B2 | 10/2009 | Oakes et al. |
| 2004/0174570 | A1* | 9/2004 | Plunkett ............... B41J 2/04505 358/3.13 |
| 2004/0240388 | A1 | 12/2004 | Albion et al. |
| 2005/0080952 | A1 | 4/2005 | Oner et al. |

(Continued)

FOREIGN PATENT DOCUMENTS

| | | |
|---|---|---|
| CN | 1797379 A | 7/2006 |
| CN | 1952916 A | 4/2007 |

(Continued)

OTHER PUBLICATIONS

The TCP/IP Guide. "TCP Segment Retransmission Timers and the Retransmission Queue." Sep. 20, 2005.

*Primary Examiner* — Samina Choudhry
(74) *Attorney, Agent, or Firm* — Eschweiler & Potashnik, LLC

(57) ABSTRACT

Embodiments relate to systems and methods for timeout monitoring of concurrent commands or parallel communication channels comprising assigning or de-assigning each one of the commands or communication channels to a corresponding one of a plurality of timeout timers when corresponding commands are to be transmitted or command acknowledges are received respectively.

8 Claims, 18 Drawing Sheets

(56) References Cited

U.S. PATENT DOCUMENTS

| | | | |
|---|---|---|---|
| 2006/0061795 A1* | 3/2006 | Walmsley | G06F 21/75 358/1.14 |
| 2009/0158282 A1 | 6/2009 | Blaisdell et al. | |
| 2009/0241001 A1 | 9/2009 | Park et al. | |
| 2011/0099595 A1 | 4/2011 | Lindquist et al. | |
| 2012/0129470 A1 | 5/2012 | Tandai et al. | |
| 2012/0155256 A1* | 6/2012 | Pope | G06F 13/128 370/230 |

FOREIGN PATENT DOCUMENTS

| | | |
|---|---|---|
| CN | 101383781 A | 3/2009 |
| CN | 101667152 A | 3/2010 |

* cited by examiner

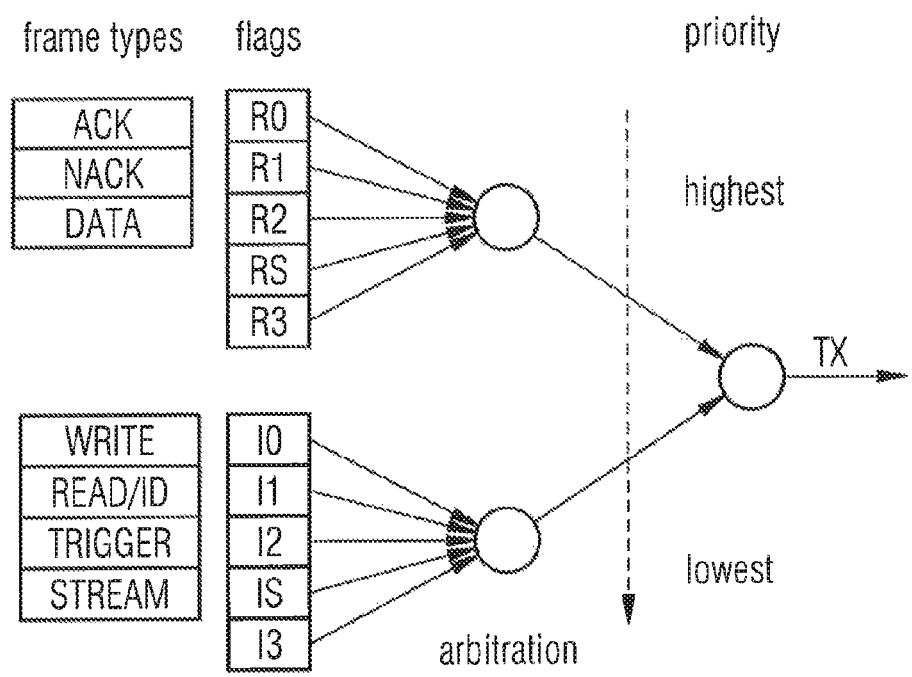

FIG 1L

|    | Initiator | Target |
|----|-----------|--------|
| TX | Tx Commands<br>SRI Master at Streaming | Tx Acknowledge<br>Tx Transaction Tag Error<br>Tx Read Answer |
| Rx | Rx Acknowledge<br>Rx Transaction Tag Error<br>Rx Read Answer | Rx Commands |

Transmit/Receive related functions

|    | Initiator | Target |
|----|-----------|--------|
| TX | Start Time-Out Timer<br>Header Generation<br>    Command Frames<br>    Stream Frames | Header Generation<br>    Acknowledge Frames<br>    Target Error Frames |
| Rx | Stop Time-Out Timer<br>Transaction Tag check | SRI Master Funktions |

Miscelaneous functions

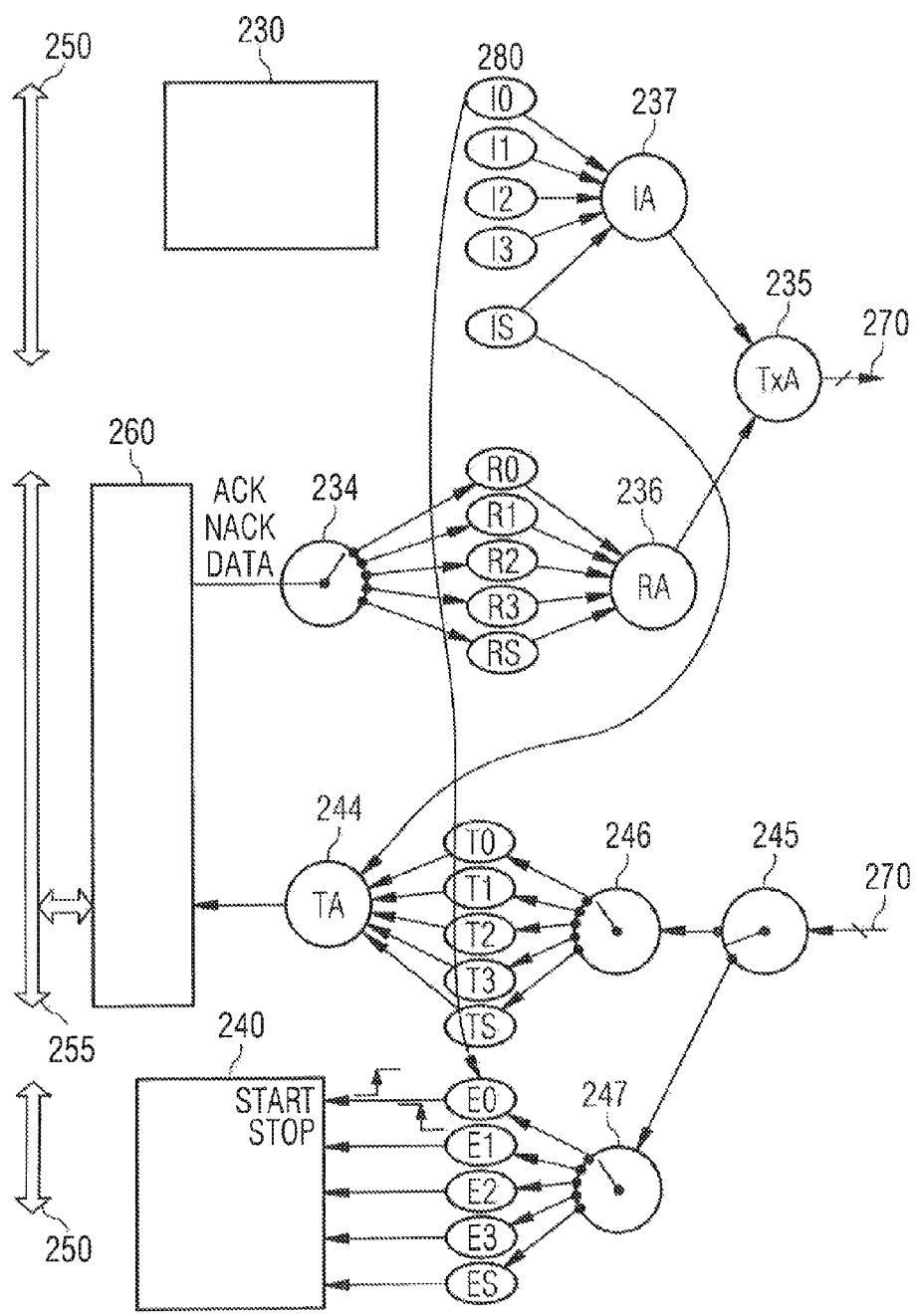

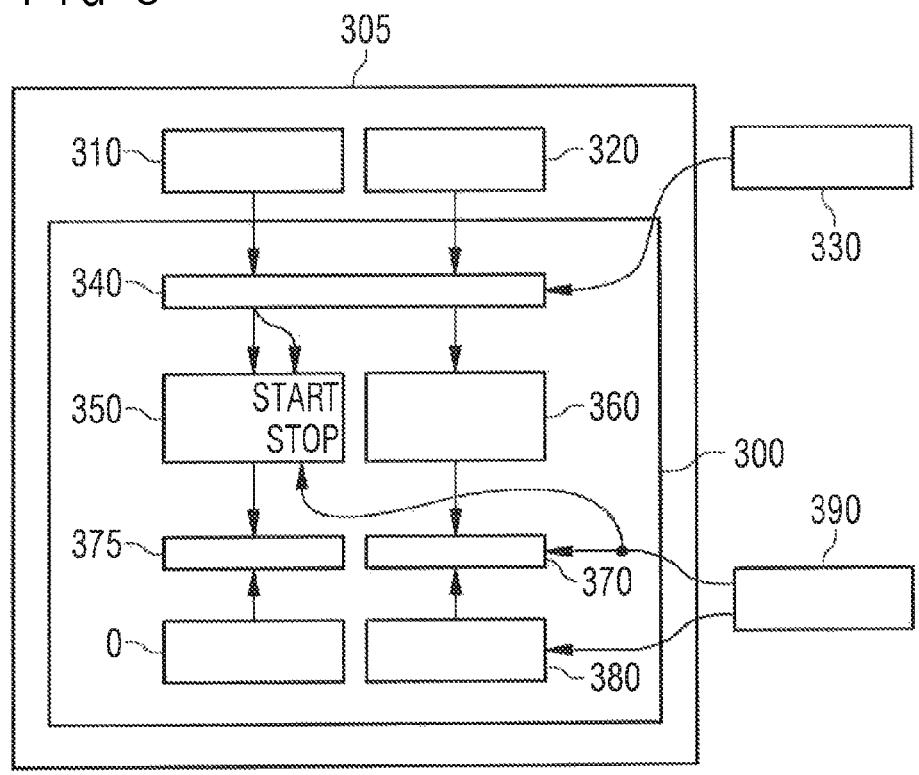

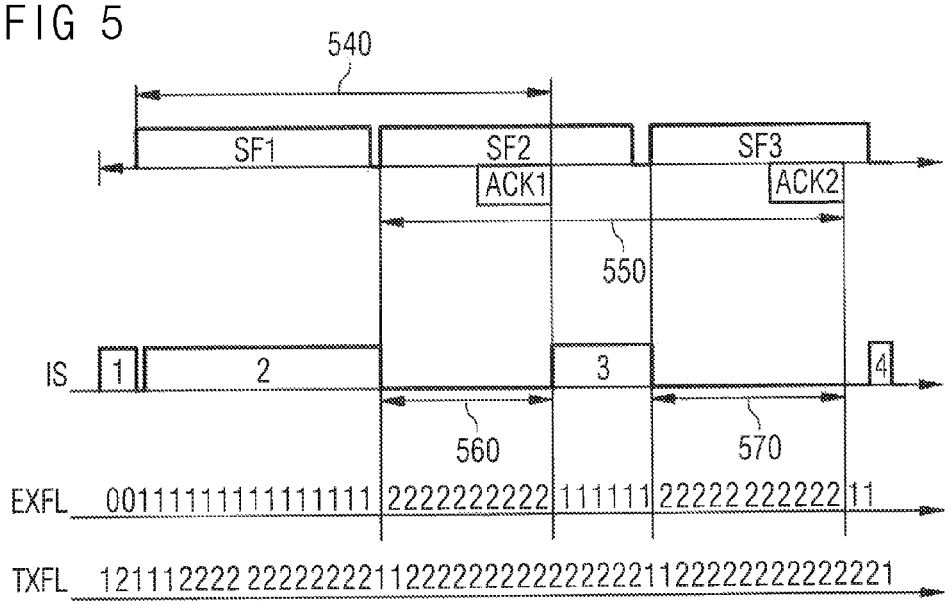

METHOD AND SYSTEM FOR TIMEOUT MONITORING

CROSS REFERENCE TO RELATED APPLICATIONS

This application is a Divisional Patent Application claiming priority to U.S. patent application Ser. No. 13/422,568 file on Mar. 16, 2012 in the name of Karl Herz, et al., entitled "Method and System for Timeout Monitoring" and is herein incorporated by reference in its entirety.

FIELD

The present invention relates generally to a method and system for flexible timeout functionalities, and, in particular, to flexible timeout functionalities in communication channels between microcontrollers.

BACKGROUND

The new HSSL protocol for communication between microcontrollers specifies extended timeout functionalities for the execution of commands. Specifically, said timeout functionalities serve to monitor the period of time from the instance in time when a corresponding command frame is sent until the instance in time when a corresponding response frame is received.

The response frame indicates a successful or erroneous execution of the corresponding command. In case the monitored period of time is exceeded, a timeout error message may be generated.

Furthermore, the HSSL protocol specifies multiple channels for commands with a fixed priority, wherein the command and response frames are transmitted over the same interface by time division multiplexing.

With regard to channel priorities, command or response frames that are transmitted over a channel with a low channel number take priority over command or response frames that are transmitted over a channel with a higher channel number. Due to the above, the execution of a command transmitted over a predetermined channel may be substantially delayed by commands transmitted over channels with a lower channel number.

Moreover, the HSSL protocol specifies pipelining for commands handling large data blocks, called stream commands, wherein multiple stream commands may be executed in parallel. Hence, the timeout functionality should provide for parallel monitoring of multiple temporally overlapping executions of stream commands.

SUMMARY

Methods and systems for timeout monitoring are provided, substantially as shown in and/or described in one non-limiting example in connection with at least one of the figures, and as set forth more completely in the claims.

Further features and advantages of embodiments will become apparent from the following detailed description made with reference to the accompanying drawings.

BRIEF DESCRIPTION OF THE DRAWINGS

The accompanying drawings are included to provide a further understanding and are incorporated in and constitute a part of this specification. The drawings relate to embodiments and together with the description serve to explain the principles of the invention. Other embodiments and many of the intended advantages of embodiments will be readily appreciated as they become better understood by reference to the following detailed description.

FIG. 1g shows a schematic block diagram of frames priorities in an HSSL module according to an example;

FIG. 1l shows a schematic overview of HSSL channel functions according to an example;

FIG. 1o shows a schematic block diagram of cross dependencies between stream frames and command frames and the corresponding response frames for an HSSL channel in an initiator role;

FIG. 2 shows an overview of request flags and an example of a communication cycle in channels with extended timeout functionalities according to an embodiment;

FIG. 3 shows a single timeout functional block with extended timeout functionalities according to an embodiment; FIG. 5 shows signal sequences during a timeout measurement for stream frames in channels with extended timeout functionalities according to an embodiment.

DETAILED DESCRIPTION

Figure 1A:
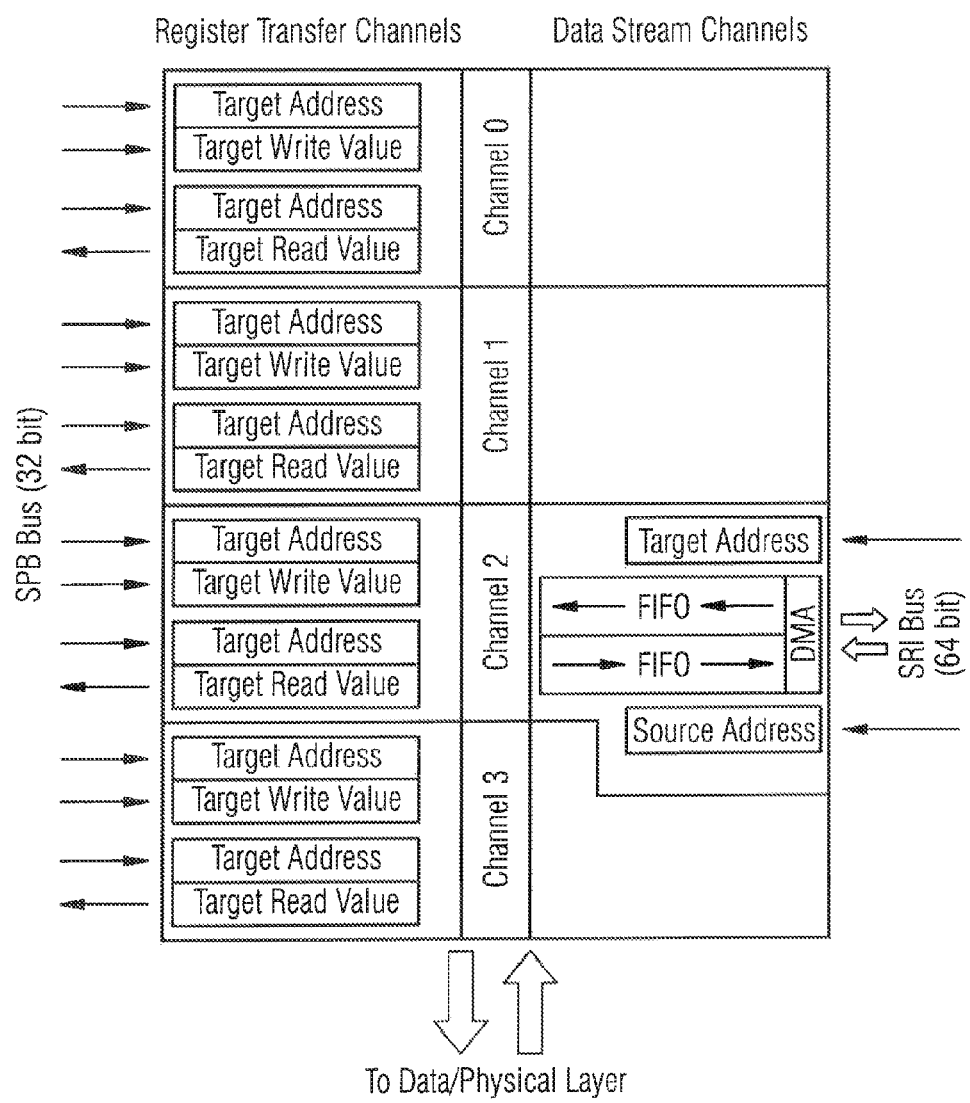
FIG. 1a shows a schematic block diagram of a High Speed Serial Link, HSSL, module according to an example.

In the following Detailed Description, reference is made to the accompanying drawings, which form a part hereof, and in which are shown by way of illustration specific embodiments. It is to be understood that other embodiments may be utilized and structural or other changes may be made without departing from the scope of the present invention. The following detailed description, therefore, is not to be taken in a limiting sense, and the scope of the present invention is defined by the appended claims.

In the following, for illustration purposes, the invention will be described with reference to timeout functionalities in communication channels—in the following description merely referred to as channels—enabling communication between microcontrollers according to the High Speed Serial Link, HSSL, protocol. However, the invention is not so limited and may find its application in conjunction with any other type of timeout protected channels.

As mentioned above, a timeout functionality represents a safety feature to protect communication between a receiver and a transmitter over at least one channel. Typically, a protected communication is particularly important for the communication of commands between microcontrollers to avoid fatal errors due to commands that are received with errors or too late.

These high demands made on inter-microcontroller communications even aggravate in cases of a plurality of channels with different priorities between the microcontrollers. As a result, there is the problem that the period of time for a command execution varies between the plurality of channels, and—hence—the optimal timeout setting does as well.

In other words, in case there is only a single timeout setting for all channels, the period of time until a timeout occurs is determined by the execution of commands with the lowest priority. As a result, for commands with higher priority a timeout notification is issued later than necessary.

Moreover, there is the problem to monitor the timeout of stream commands which may be executed in parallel. However, until now, no parallel timeout monitoring for the pipelining of command executions was required.

Accordingly, in an embodiment, each channel may comprise its own timeout timer which may be loaded with a timeout value that is configurable for the respective channel. Hence, the corresponding channel specific timeout timers may set optimal timeout periods for each channel individually. In others words, for each channel, a specific optimal time period may be provided for the timeout of commands on this channel.

With respect to stream commands, a further embodiment may comprise a plurality—for instance two—timeout timers for monitoring concurrently executable stream commands. This plurality of timeout timers may be addressed and managed like elements of a FIFO.

In this regard, a write pointer may select and start a next free one of the plurality of timeout timers in response to a new stream command frame which starts the transmission of a corresponding new stream command. Moreover, a read pointer may select and stop a predetermined one of the plurality of timeout timers in response to the complete receipt of the stream acknowledge frame corresponding to the stream command frame which started the predetermined one of the plurality of timeout timers.

In other words, the FIFO principle may be used for the management of the plurality of timeout timers so that the timeout monitoring of parallel executions of stream commands is enabled.

Further embodiments will be described particularly in conjunction with FIGS. 1 to 5. However, before, a more detailed description of the HSSL module application will be given with regard to FIGS. 1a to 1o.

In the following, a list of abbreviations, acronyms and term definitions will be provided:
ACK Acknowledge Frame
ASIC Application Specific Integrated Circuit
BPI Bus Peripheral Interface
CRC Cyclic Redundancy Check
DMA Direct Memory Access
EMI Electromagnetic Interference
EXFL Expect FIFO virtual Filling Level
EXI Exception Interrupt
FIFO First-in, First-out
HSSL High Speed Serial Link
Initiator Device that starts an HSSL transaction by sending a command frame
ISB Initiator Stream Block
ISF Initiator Stream FIFO
JTAG Joint Test Action Group
LSB Least Significant Bit
MSB Most Significant Bit
NACK Not Acknowledge Frame (Target Error Frame)
SPB Serial Peripheral Bus
SRI Shared Resource Interconnection
SoC System on Chip
Target Device that responds to a command frame sent by an initiator
TO Timeout
TOREL Timeout Reload Value
TTAG Transaction Tag
TTERR Transaction Tag Error
TXFIFO Transmit FIFO
TXFL Transmit FIFO virtual Filling Level In the above-mentioned HSSL application, the HSSL module may provide point-to-point communication of both single data values and of large data blocks, the already mentioned streams. The communicating devices connected by an HSSL may be complex microcontrollers, or a microcontroller and a device with only basic execution capabilities.

In an example of the HSSL application as shown in FIG. 1a, there may be four channels to transfer single values to or from a target. The channels may support direct writing of 8, 16 or 32-bit data from an initiator into a target's register, as well as reading a value from a target, performed by a module's internal master on the target side. For transferring large data blocks, i.e. for a streaming functionality, there may be a channel containing FIFO memories.

The HSSL module may implement transport layer tasks and hand over the data to another module which may provide data link layer and physical layer services, data serialization and transmission. All transfers may be protected by safety features like CRC and timeout.

The HSSL module may generate all necessary protocol formats in order to enable two devices to communicate to each other. Two basic modes may be supported. In register transfer mode, the transmitter ("sending device") may provide an address and a data value by writing them into dedicated registers of the HSSL module. The HSSL module may put the data into an envelop—called a frame—and forward the frame via physical layer to the target device. The target may take the information out of the frame and write the received data into the address which came in the same frame as the data. If the sender requests to read the content of a register or a memory location, it may simply send only the address. The target device may read the value from the specified location and may provide it to the sender by transferring it through an answer frame, which may comprise its own format.

The transfer of register or memory contents may be protected by several safety and security levels. A 16-bit CRC value—called CRC16—may be attached to the end of each frame. Each transfer process may trigger a watchdog, which may make sure that the communication happens within a deterministic schedule. The target device itself may offer the capability to define access windows, which allow reading or writing only from or into certain address ranges.

Each frame should be acknowledged by the target by sending an appropriate response frame. If the response frame does not come inside a predefined time window, the initiator module may trigger a timeout interrupt.

In data stream mode, data blocks of a user defined size may be moved from the memory of the sending device into the memory of the target device. A DMA master, which may be configured with any source address and source length, autonomously fetches data, breaks it into smaller blocks of programmable size, and puts it into a FIFO.

In an application, a lower level companion module of the HSSL module may empty the FIFO from the "other side" to the physical lines which connect the corresponding two devices. Accordingly, the target device may receive a structure, which is inverse to the sender system, the data blocks, put them into a FIFO, which may in turn be emptied by a DMA master into the target memory.

In the example, all streaming data transfers may be subject to the protection features that are available for the register transfer mode. After module reset, in a typical example, most registers may only be released for read remote access. They may have to be unlocked by the local software.

In order to ensure consistent initialization of an HSSL channel, there is a possibility to determine the feature set of the HSSL module by using the JTAG ID of the device, which uniquely identifies the available hardware options of the HSSL module. ASIC versions of the HSSL interface may only employ stripped down instances.

Figure 1B:
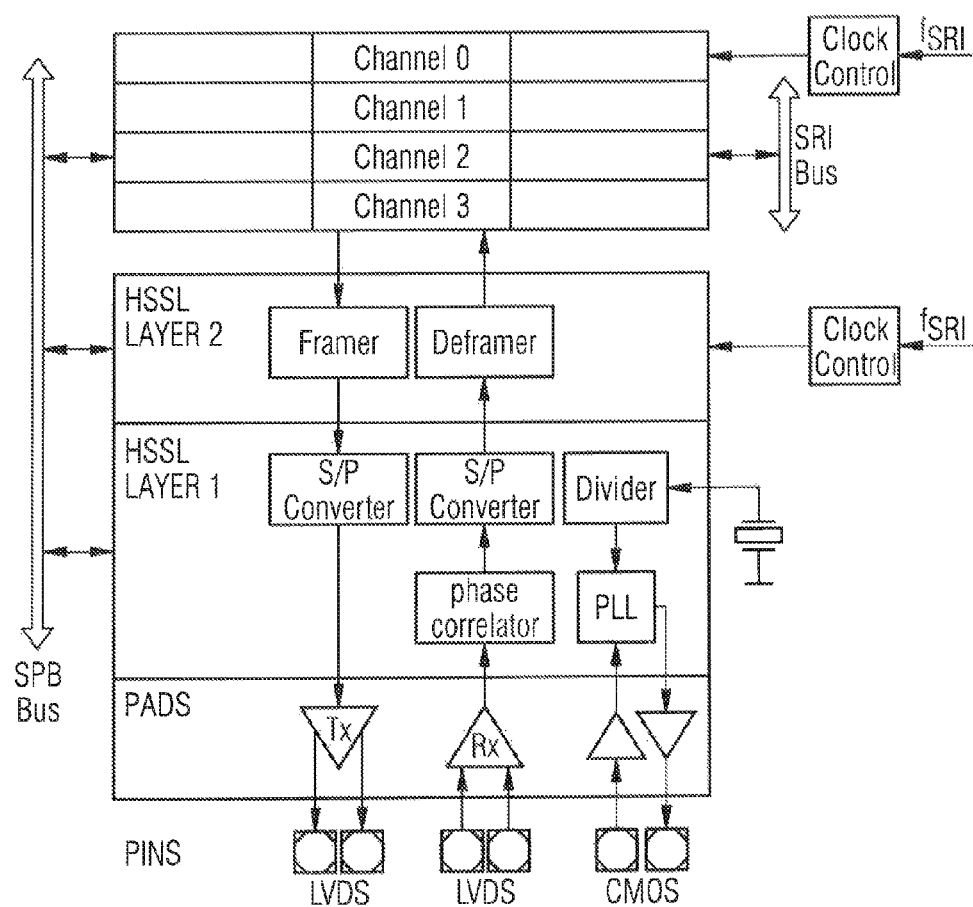
FIG. 1b shows a schematic block diagram of a lower communication layers module, short HSCT module, according to an example.

In the example as shown in FIG. 1b, the lower level companion module or logic, abbreviated HSCT module, may control the lower communication layers positioned between two devices, namely the data and the physical level. The chip to chip interface may employ a digital interface for inter chip communication between a master IC and a slave IC. The interface may be capable of running in a master or in a slave mode. During a configuration phase, the corresponding role of the interface—i.e. master or slave—should be defined. It is typically not intended to change the system role during an application.

The interface may comprise a full-duplex receive and transmit high-speed data interface based on double ended differential signals—i.e. in total four lines—and a master clock interface, SYS_CLK. The master IC may own a crystal oscillator and provide the clock to the slave. The interface reset may be derived from the system reset and provided by chip internal reset signaling.

In an example, features of an HSSL will be described. In this regard, an HSSL may enable transmission of symbol information from the master IC to the slave IC and receive symbol information sent from the slave IC to the master IC. The corresponding system clock may be provided by the master IC—owning a crystal oscillator—to the slave IC. The HSSL may enable exchange of control information in both directions.

Furthermore, the HSSL may provide clear to send indications in both directions, unsolicited status indications in both directions as well as regular data transfer in both directions based on a plurality of channels for data.

In an example, the master IC may transfer data at speeds of 5 MBaud and 320 MBaud. Furthermore, in an application, there may be three slave IC data transfer speeds available based on a 20 MHz system clock, namely 5 MBaud (low speed), 20 MBaud (medium speed) and 320 MBaud (high speed). Moreover, two slave IC data transfer speeds may be available based on a 10 MHz SYS_Clk causing lower EMI, namely 5 MBaud (low speed) and 320 MBaud (high speed). The interface of the HSSL layer 1 may be based on IEEE 1596.3 LVDS IOs. To reduce the voltage swing, a configuration option may be available.

In the following, a high level protocol definition of the HSSL interface will be described. The HSSL communication may comprise two stage transactions, namely sending a command and an receiving a response. It may involve two participants, namely an initiator, which starts a transaction by sending a command, and a target, which responds to the command.

In the following, the generation and the types of communication frames will be described. The HSSL module may generate a serial frame by taking the payload delivered by a CPU or a DMA, first wrapping it in an HSSL frame by adding header and CRC fields, and then wrapping the HSSL frame in a HSCT frame by adding sync, header and end bit fields.

There may be three general classes of frames, namely command frames, response frames and stream frames, which may also be referred to as streaming frames. Command frames may be sent by the initiator to request an action by the target. In the following, command frames are sometimes also alternatively referred to as WRT frames.

There may be four types of command frames: Firstly, write frames may be used by the initiator to request the target controller to write the data to the address, both provided by the initiator.

Secondly, read frames may be used by the initiator to request the target controller to read and deliver a content from an address from its address space.

Thirdly, read ID frames may be used by the initiator to request the target controller to read and deliver a content uniquely defining the target device. The answer may be a standard read data answer frame.

Fourthly, trigger frames may be used by the initiator to trigger a trigger interrupt in the target module.

The above-mentioned second class of frames may be response frames. Response frames may be sent by the target either to deliver the requested data or to report a successful or unsuccessful completion of a request.

There may be three types of response frames:

Firstly, read data answer frames may be used by the target to deliver the data requested by the initiator with a read command frame. A read data answer frame is frequently simply referred to as a data frame.

Secondly, acknowledge frames may be used by the target to confirm the completion of a write or trigger command. Frequently, an acknowledge frame is referred to as an ACK frame.

Thirdly, target error frames may be used by the target to report the unsuccessful attempt to complete a write or read command. Frequently, a target error frame is referred to as a NACK frame.

Finally, the third general class of frames mentioned above are stream frames. Stream frames may be used by the initiator controller for sending data streams. A stream frame may behave similar to a write command frame comprising a long 256-bit data block. A stream frame may be acknowledged in the same way. However, the corresponding stream acknowledge may use a sliding window with depth of two instead of one as for simple command frames. The corresponding "Sliding Window" protocol will be discussed in more detail below in conjunction with FIGS. 1c and 1d.

In the following, the types of HSSL data will be described. Specifically, there may be four types of HSSL data, namely 8-bit, 16-bit, 32-bit and 256-bit stream blocks. In case of 8, 16 or 32-bit data types, the transmitted number of bits may typically be 32, while the shorter data types may be copied several times to fill up this length.

In the following, an example of the CRC management of the HSSL module will be described. The HSSL protocol typically uses the CRC-16-CCITT polynomial: $x^{16}+x^{12}+x^5+1$ with the following standard properties: The hexadecimal value of 0xFFFF may be used as the seed. The calculation may be performed starting from the MSB, i.e. MSB first, namely MSB to LSB of the header and then MSB to LSB of the payload. The CRC result may be expressed starting from the MSB.

In the following, an example of the header structure of HSSL frames will be described. The HSSL header may comprise the protocol information that is required additional to the raw payload data. The HSSL header may describe the payload data regarding the length and the type, and carry additional information like channel number code and transaction tag. The HSSL header may also carry stand-alone information in case of frames without payload, like acknowledge and trigger frames.

In the following, an example of transfer policies for single frame transfers and stream frame transfers are described. In this regard, single frame transfers are typically performed expecting an acknowledge. Similarly, stream frame transfers are typically performed with acknowledge. Typically, only write streams are possible, whereas read streams are not possible.

In the following, an example of the sliding window protocol will be described. The HSSL module may implement at least two variants of the sliding window protocol regarding a sliding window depth for flow control.

In this regard, a sliding window depth of one may be used for simple write command frames. The depth of one means that a single timeout timer may track the arrival of the corresponding response frame. A new command may be sent only after the response to the previous command has been received or a timeout occurred.

In contrast to the above, a sliding window depth of two is used for stream frames. The depth of two means that there may be at least two timeout timers tracking the acknowledge times for the two latest stream frames. In this case, a second stream frame may be sent although an acknowledge or timeout to the previous stream frame has not been received yet. After the beginning of the transmission of the second stream frame, no third stream frame may be sent before the first stream frame has been acknowledged (cf. FIG. 1d, and also FIG. 5).

Figure 1C:
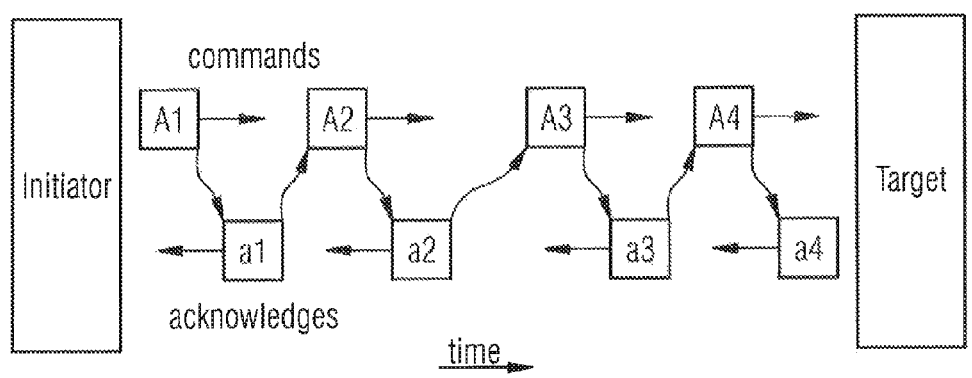
FIG. 1c shows a schematic block diagram of flow control for a single HSSL communication channel with a single timeout timer tracking the arrival of a latest response frame according to an example.

An example of communication using the sliding window protocol with a depth of one is shown in FIG. 1c. In the example, the initiator may send commands—in FIG. 1c labeled with the capital letter "A"—originating from one and the same channel, for example channel 0. The corresponding acknowledge frames from the target are labeled with the small letter "a" in FIG. 1c.

In the example, according to the sliding window protocol, the target is capable of sending acknowledge frames, whereas the initiator is capable of operating timeout timers. Every time the target receives a frame without detecting an error, it may send a response or acknowledge frame to the initiator.

Figure 1D:
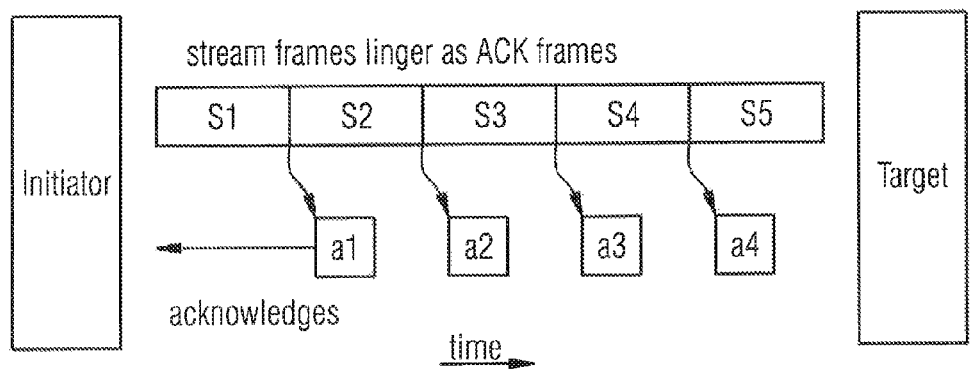
FIG. 1d shows a schematic block diagram of flow control for an HSSL stream communication channel with two timeout timers tracking the acknowledge times for the latest two stream frames according to an example.

However, if the target detects a frame with a CRC error, it does not send an acknowledge frame. The missing acknowledge may cause a timeout event in the initiator channel. FIG. 1d shows that if the command frames are longer than the acknowledge frames plus the reaction time—like for example in case of stream commands—back to back transfers are easily possible.

In the following, an example of the error management of the HSSL protocol will be described. In the described example, the HSSL protocol defines four types of errors, namely timeout error, transaction tag error, CRC error and target error.

A timeout error may be detected at the initiator side if the expected ACK frame was not received within an expected time window. This may occur if a frame had been sent by the initiator and the target detected a CRC error and did not answer with an acknowledge, or the connection between the initiator and the target is physically damaged in one or the other direction.

A transaction tag error may occur at the initiator side if instead of the expected ACK frame with the expected TAG number, an acknowledge with an unexpected transaction tag was received. This would indicate a missing frame or a missing acknowledge. A transaction tag error may generate frames that pass the CRC checking stage.

A CRC error may occur in different cases. Firstly, it may occur at the target side, in which case the CRC error flag may be set, the received command frame with the CRC error may be discarded, no acknowledge frame is typically sent and a channel unspecific EXI error interrupt may be generated, if enabled.

Secondly, a CRC error may occur at the initiator side, in which case the CRC error flag may be set, the received response frame with the CRC error may be discarded and a channel unspecific EXI error interrupt may be generated, if enabled.

Both scenarios may lead to a timeout at the initiator side. In both cases, the CRC error flag may be set at the side receiving the erroneous frame—i.e. either initiator or target—and an interrupt may be generated, if enabled.

For the purpose of CRC error injection, a bit field with an XOR mask used for toggling the bits of the calculated CRC may be provided. In order to switch on this feature, the E (Endinit) protected bit should be set by the application software. The error injection may only influence the generation of the transmitted CRC.

A target error may occur at the target side. When accessing the target memory, a bus error or memory protection error may occur. In such a case, the target may respond with a NACK frame indicating the error.

The following part of the description describes an example implementation of the HSSL protocol.

Figure 1E:
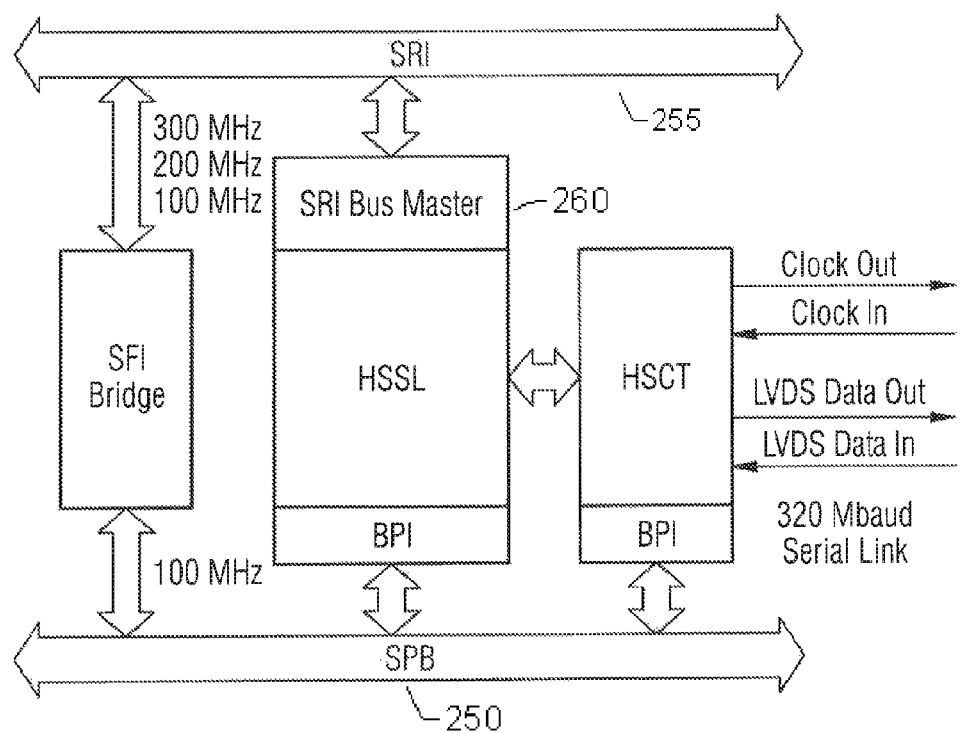
FIG. 1e shows a schematic block diagram of interfaces and busses connected to an HSSL module according to an example.
Figure 1F:
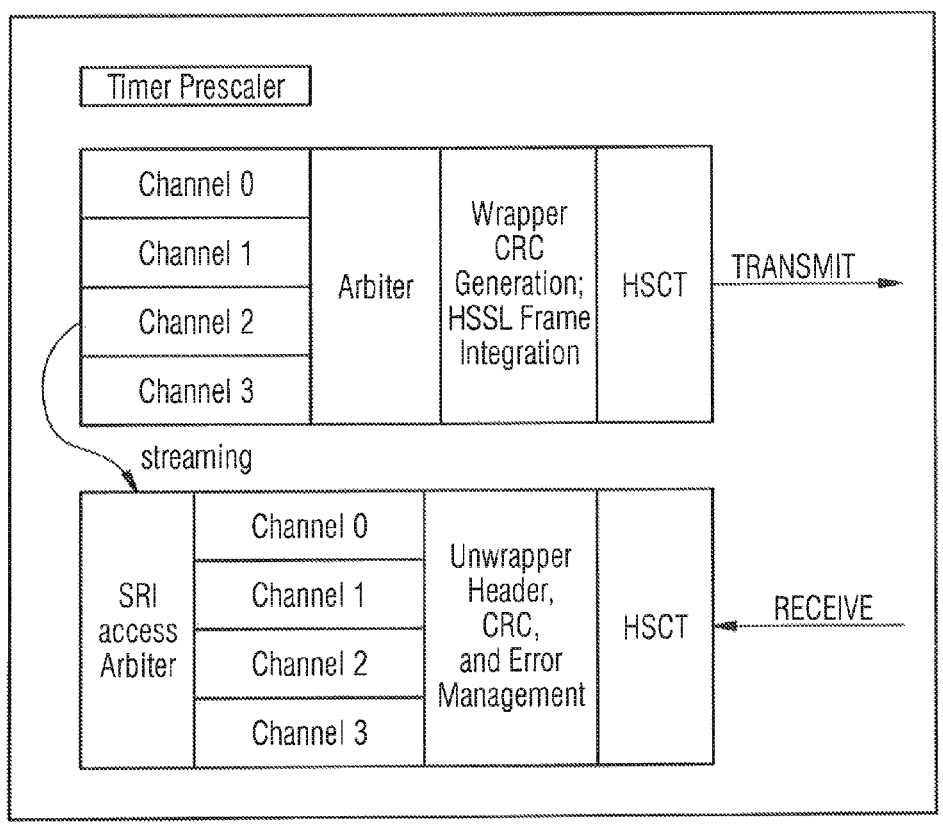
FIG. 1f shows a schematic block diagram of an architecture of the HSSL layer according to an example.
Figure 1H:
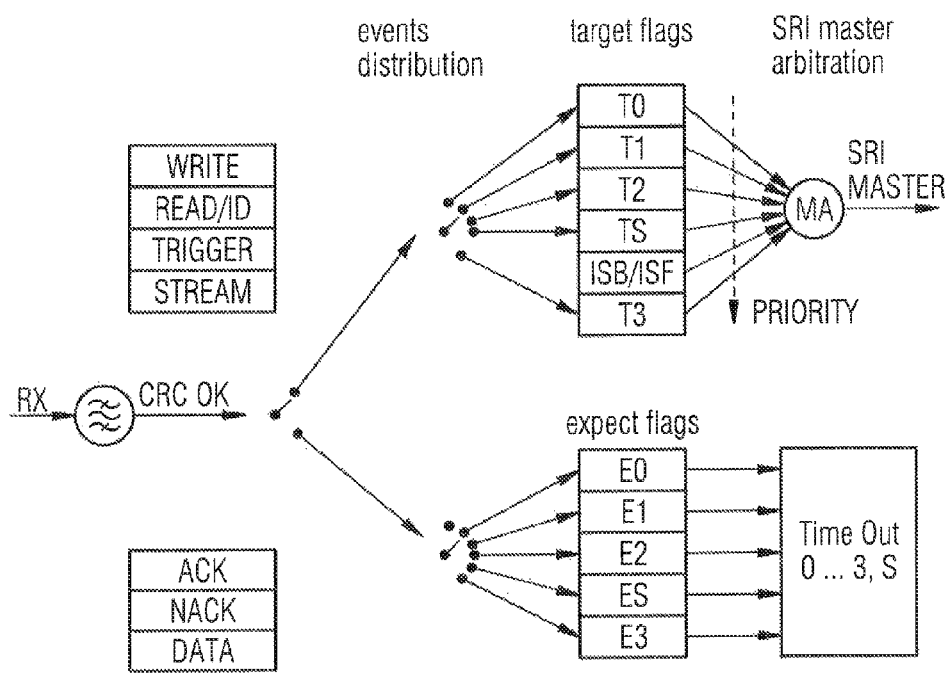
FIG. 1h shows a schematic block diagram of the management for received frames and command execution over HSSL channels according to an example.
Figure 1I:
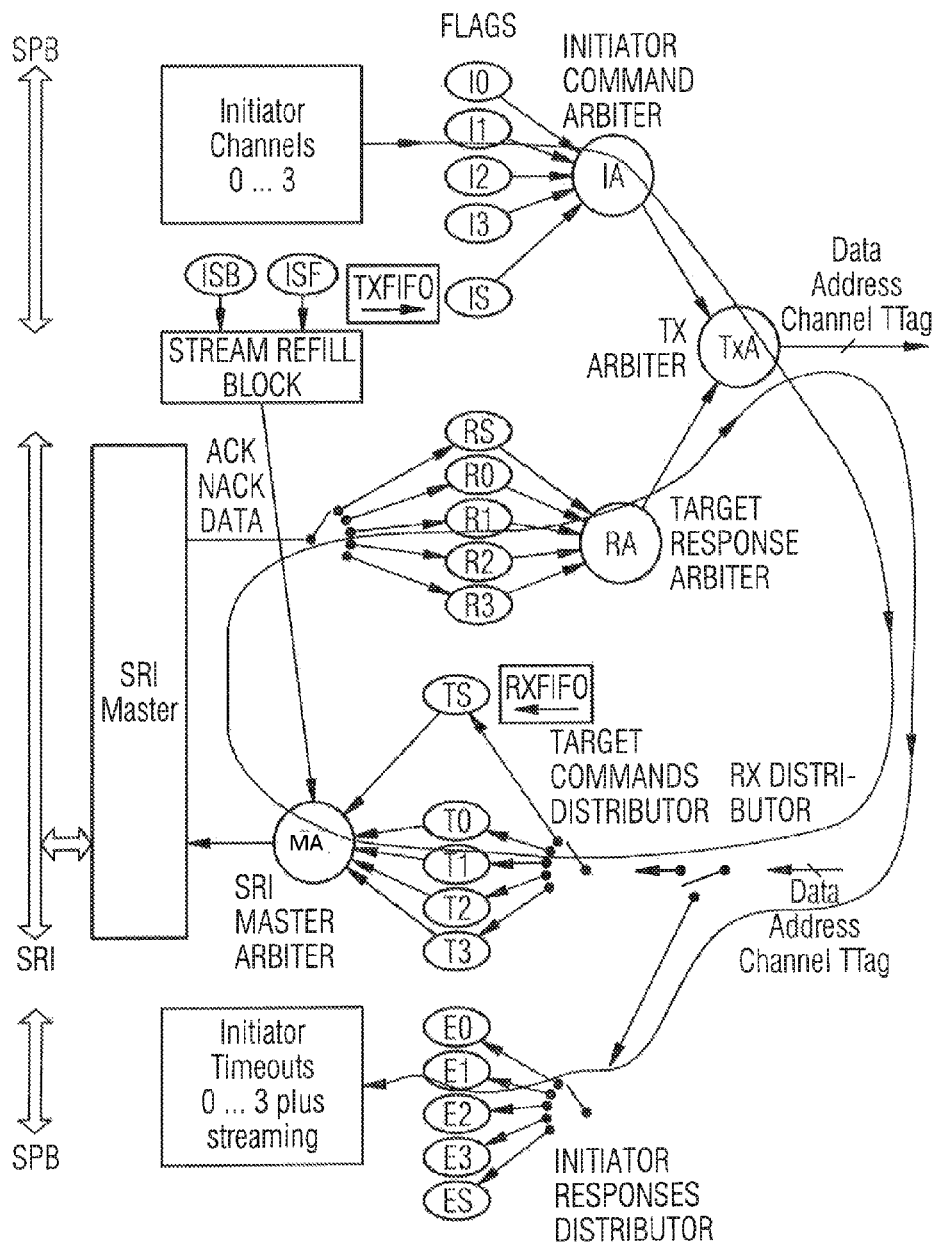
FIG. 1i shows a schematic overview of request flags and an example for a communication cycle on HSSL channels.

In this regard, FIG. 2 shows an overview of request flags and in conjunction with the corresponding FIG. 1i in an example of a communication cycle in channels with extended timeout functionalities according to an embodiment.

In the embodiment in FIG. 2, commands are initiated on initiator channels 230. These initiator channels 230 may comprise channels 0, 1, 2, and 3 as well a streaming channel. For that purpose, the corresponding initiator request flags I0, I1, I2, I3 or IS may be set by a TXFIFO as depicted in FIG. 1i.

The resetting or clearing of a initiator request flag, for instance I0, may cause the start of the transmission of a corresponding command and the start of a corresponding one of a plurality of initiator timeout timers 240 by setting a corresponding expect flag, for instance E0. This example is indicated in FIG. 2 by the arrow connecting flags I0 and E0.

Moreover, the plurality of initiator timeout timers 240 may comprise a timeout timer for each of the channels 0, 1, 2, and 3 as well as the streaming channel.

If multiple command requests are pending on the initiator channels 230, initiator command arbiter 237 may arbitrate between them.

For a better understanding, FIG. 1i shows an example of a full communication cycle between initiator and target which is indicated by the curve with arrows in FIG. 1i.

The command on the channel which wins the arbitration—for instance the command on channel 1 as triggered by initiator request flag I1 in the above-mentioned example of the communication cycle in FIG. 1i—may be received by a transmit arbiter 235 that may arbitrate between target response requests arbitrated by target response arbiter 236 and the initiator requests arbitrated by the initiator command arbiter 237.

The corresponding transmission prioritization is also described further below in conjunction with FIG. 1g.

The transmit arbiter 235 may trigger the transmission of the corresponding command frame over the HSSL. The information transmitted by the frames as arbitrated by the transmit arbiter 235 may comprise information 270 relating to data, target address, channel and transaction tag of the frame.

After transmission over the HSSL, the frame may be received by a receive distributor 245. In the example as shown in FIGS. 1i and 2, the receive distributor 245 may forward the transmitted command frame to a target commands distributor 246. In said communication cycle example of FIGS. 1i and 2, the target request flag T1 may be set by the target commands distributor 246 and cleared by the target arbiter 244 of the SRI master 260 also referred to as SRI master arbiter in FIG. 1i.

After the command has been executed, the SRI master 260 may trigger a corresponding response request via the target response distributor 234. In the communication cycle example of FIGS. 1i and 2, the response request flag R1 may be set by the target response distributor 234 and cleared by the target response arbiter 236.

After the corresponding arbitration of the response by the target response arbiter 236 and after the corresponding response has won the transmit arbitration at the transmit arbiter 235, a corresponding response frame may be transmitted over the HSSL.

After the complete receipt of the response frame at the initiator indicating a successful execution of the original command at the target—in the communication cycle example of FIG. 1i—the expect flag E1 may be reset by the receive distributor 245 via the initiator responses distributor 247 to stop the corresponding one of the plurality of initiator timeout timers 240 for the successfully executed command. This represents the end of the example of a full communication cycle as shown in FIG. 1i.

As shown in the example of FIG. 1e, the HSSL module may be connected to the SRI bus 255 using an interface of the SRI master 260, and to SPB bus 250 using a slave BPI. The SRI master 260 may be capable of performing single and burst read and write operations on the SRI bus 255. Additionally, a kernel of the HSSL may provide logic for performing streaming communication. The write and read accesses may typically be performed in a user mode.

The above-mentioned SPB BPI interface may be a slave interface which may be used for writing registers of the HSSL module by an external SPB master (DMA, CPU, SRI to SPB Bridge), thus configuring the HSSL module and performing single read and write operations.

In the following, an example of the HSSL module operation will be described. The HSSL module may comprise a separate transmitter and receiver, each comprising the above-mentioned four channels as also shown in the example in FIG. 1f. The transmitter may comprise a corresponding transmit arbiter block and a wrapper block, which are common for all channels. The transmit arbiter may provide the fixed arbitration between the channels which are ready to send when the HSSL is available, with channel 0 having the highest priority, and the channel 3 having the lowest priority. The wrapper block may generate the CRC data.

The receiver may unwrap the HSSL frame, discard the frames with a CRC error, and distribute the error free commands and acknowledges to the channels. A common prescaler may generate the time basis for all channels, in particular for their timeout timers.

The following part of the description relates to transmission prioritization of frames over an HSSL channel according to an example. FIG. 1g shows an example in which multiple frames are pending. In this case, an arbitration may be performed between them. Each channel may activate two flags, namely the initiator request flag and the response request flag. As already described in conjunction with FIG. 2, the initiator request flag for channel 0 is abbreviated as I0 and the response request flag as R0, for channel 1, I1 and R1 and so on. Among the response and command frame request types, the response request type may have a higher priority. Among the requests of a same type, a lower channel number may have a higher priority. A pending frame may be indicated with a corresponding request flag in a register QFLAGS.

The SRI master 260 may set the response requests (i.e. the Rx flags). The software write accesses via the SPB bus 250 may set the initiator requests (i.e. the Ix flags). The transmit arbiter 235 may clear the initiator and response request flags of the arbitration winner.

The following part of the description relates to the management of received frames and command execution over an HSSL channel according to the example as show in FIG. 1h. After a frame passes the CRC check, it may be checked for its type. A received command frame may set a target request flag Tx for the SRI master 260, a received response frame may reset the expect flag Ex and stop the respective channel timeout.

The target request flags Tx may be set by the target commands distributor 246, and cleared by the target arbiter 244 of the SRI master 260. The expect flags Ex may be set by the initiator requests Ix via the transmit arbiter 235, and reset by the receive distributor 245.

In the example as shown in FIG. 1i, the ISB and ISF flags operate together to control the streaming process. The ISB flag, may be set by the software to enable the streaming. The ISF flag may be set or cleared by the TXFIFO according to its filling level.

The CRC error and TTERR flags may be located in an MFLAGS register. If the channel does not have a command pending and does not expect a response, it is ready. Moreover, FIG. 1*i* shows an overview of a full communication cycle over all sections of a channel—i.e. initiator, target or receive, transmit.

In this context, the above-mentioned QFLAGs register of the HSSL module may be relevant. This register may comprise flags indicating if an appropriate action request is pending or not. The action request may be pending in different stages of the communication cycle as shown in FIG. 1*i*.

The QFLAGs register may comprise the Ix initiator request flags for initiated commands. These flags may be set by the corresponding channel when a WRT command is initiated. The WRT commands may be initiated via the SPB bus. The S(tream) commands may be initiated by the HSSL module internally, by the TXFIFO as indicated in FIG. 1*i*, except for the first stream frame start, which may be initiated via the SPB bus.

Furthermore, the QFLAGs register may comprise the target request flags Tx for commands arrived at the target. These flags may be set by the hardware according to the header information of a frame arrived at the target without a CRC error. They may be used by the target arbiter 244 of the SRI master 260 and cleared when the appropriate command is executed.

Moreover, the QFLAGs register may comprise the response request flags Rx for response frames at the target. After a command has been executed by the SRI master 260, an appropriate response request flag Rx may be set indicating that an ACK, NACK or DATA frame is pending.

Additionally, the QFLAGs register may comprise the expect flags Ex for the corresponding activated timeout timer. An appropriate two bit flag may be set by the hardware when a timeout timer for a channel is started. The hardware may clear the appropriate flag when any response frame arrives at the initiator. In case of an unexpected response, a corresponding UNEXPECTED flag may be additionally set. In an example, a value of $00_B$ of the expect flags may indicate that no request is pending, a value of $01_B$ that a write request is pending, a value of $10_B$ that a read request is pending, and a value $11_B$ that a trigger request is pending.

Above that, the QFLAGs register may comprise the corresponding flags IS, RS, TS, ES for stream frames.

Figure 1J:
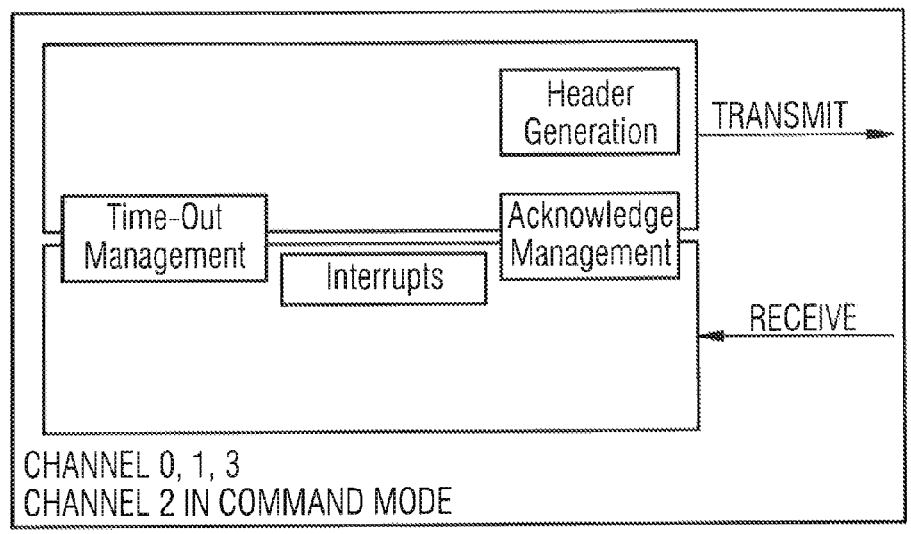
FIG. 1j shows a schematic block diagram of an architecture of HSSL channels in command mode according to an example.

In the following, the HSSL channel architecture will be described according to an example. FIG. 1*j* shows an example of the architecture of channels 0, 1, 3 and channel 2 in a command mode. As shown, the HSSL module may comprise the four channels.

Figure 1K:
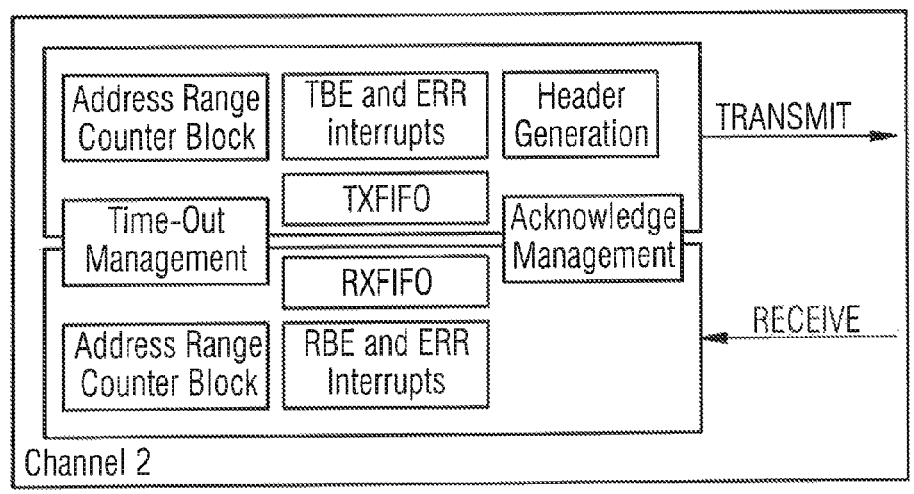
FIG. 1k shows a schematic block diagram of an architecture of an HSSL stream channel according to an example.

Furthermore, FIG. 1*k* shows an example of the HSSL architecture of channel 2. In this example, channel 2 may be switched between the command and streaming mode of operation. In single mode, a single data register may be used, and in streaming mode, a FIFO may be used. Channel 2 may comprise one initiator and one target address counter which may be used to fill a memory range with data. Each address range counter may comprise two start address registers and one stream frame count register. At reaching a predefined frame count, a wrap around may automatically be executed.

FIG. 1*l* shows, that the functionality of each channel may be subdivided in two ways. Firstly, the functionality of each channel may be subdivided into a transmitter and a receiver functionality. In this regard, the transmit functionality may generate an appropriate header for each frame, whereas the receive functionality may generate an appropriate acknowledge header with the tag and channel number code. The read and writes may be performed by the SRI master 260. Therefore, the module may send back a target error frame to the transmitter if an error occurs on the SRI bus 255 and the transfer on the SRI 255 bus can not be executed. Furthermore, the timeout monitoring on one hand and the acknowledge management on the other hand may involve both the transmitter and receiver channels.

Secondly—as further shown in FIG. 1*l*—the functionality of each channel may be further subdivided into an initiator and target functionality. The initiator functionality may transmit write, read or trigger command frames in random sequence, after the previous command has been responded to. For instance, the generation or comparison of a transaction tag per channel may be an initiator functionality. In the present example, the timeout management is a pure initiator functionality. Finally, the target functionality may be configured to receive commands, execute them, and generate and transmit responses.

Figure 1M:
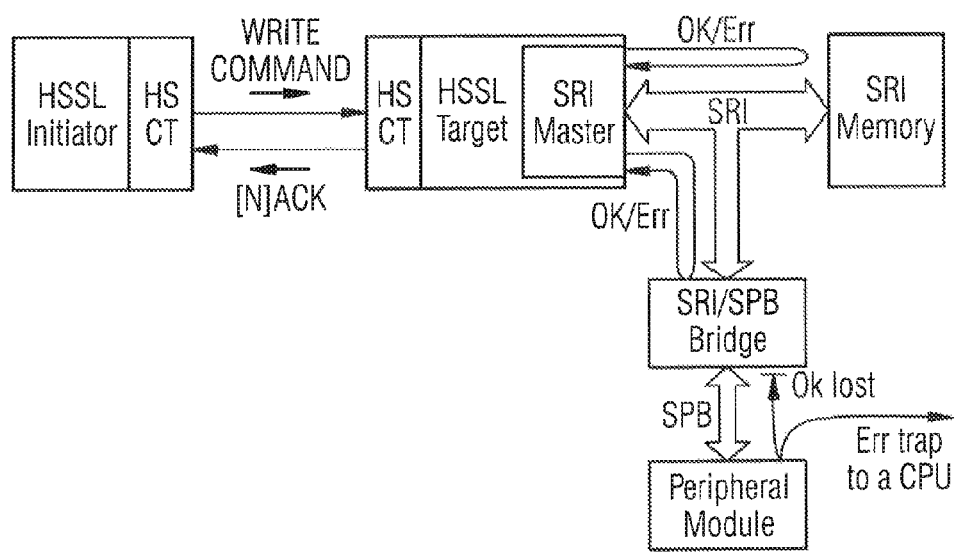
FIG. 1m shows a schematic block diagram of bus error feedback paths in an HSSL application according to an example.

In the following, various cases of providing acknowledge responses are discussed according to an example. In this regard, FIG. 1*m* illustrates an example of bus error feedback paths. A read or write command may be executed by the SRI master 260. The SRI master 260 may read or write the SRI bus 255 and signal either a successful SRI transaction or an error.

In the example, there may be the following cases. If the SRI master 260 writes or reads an SRI memory, both cases may be acknowledged so that the HSSL module receives a feedback in any case.

If the SRI master 260 reads an SPB address over the SRI or SPB bridge, both successful and unsuccessful access may be signaled back to the module.

If the SRI master 260 writes to SPB bus, it may deliver a feedback if the write transaction to the bridge was successful or not, and not if the write transaction to the register, i.e. the end point, was successful or not. In such a case, executing a read command frame may be used to check if the write transaction was successful.

Finally, a CPU may send a notification via some HSSL channel within an error trap handling routine.

Figure 1N:
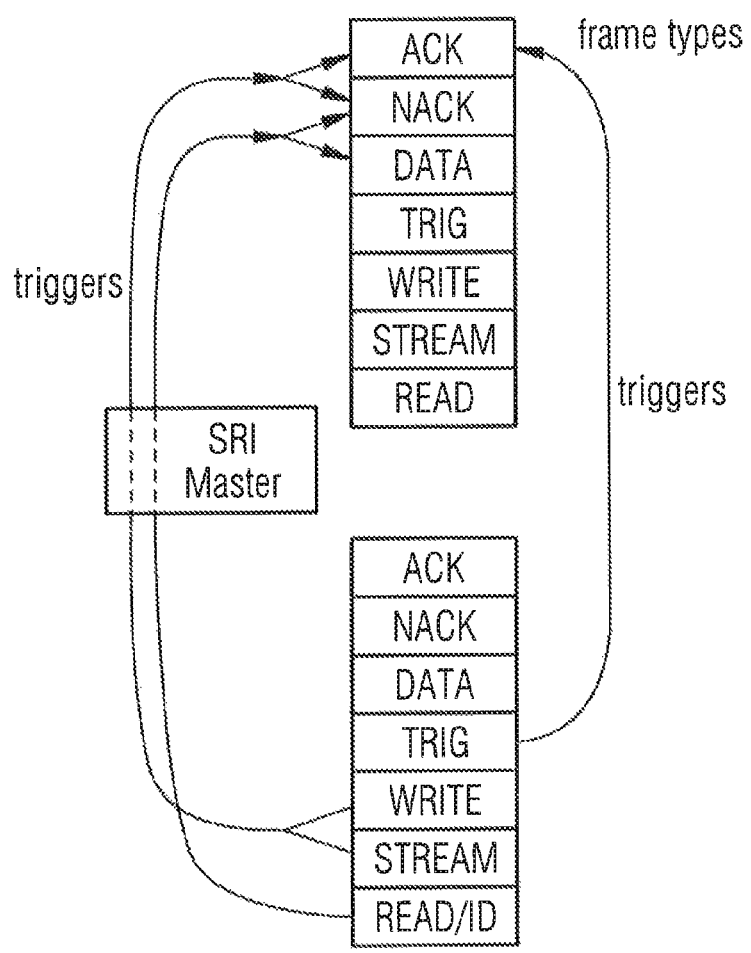
FIG. 1n shows a schematic block diagram of cross dependencies between stream frames and command frames and the corresponding response frames for an HSSL channel in a target role.
Figure 10:
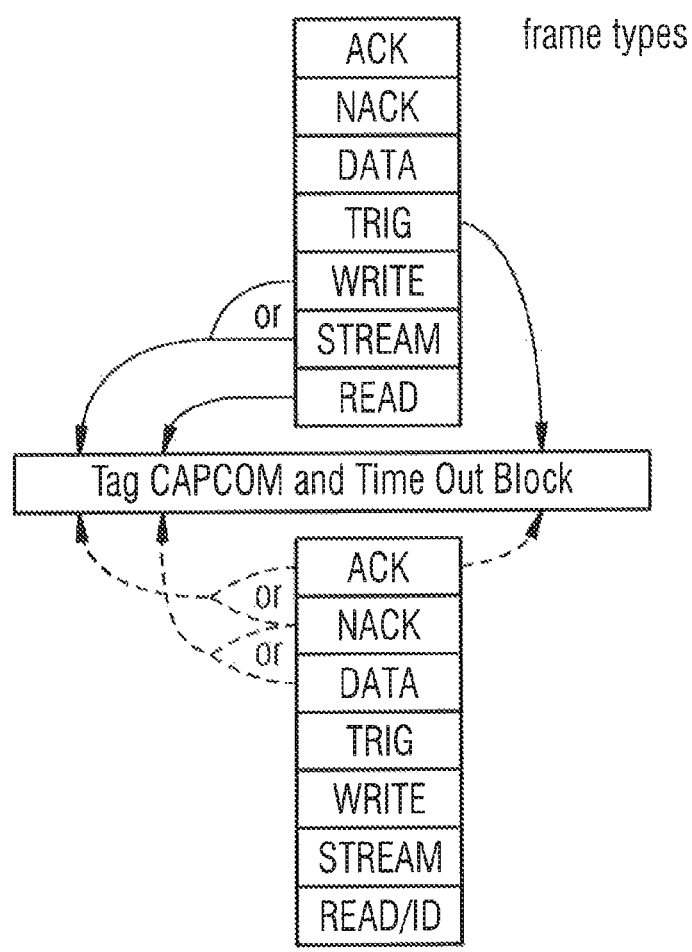

The following part of the description relates to cross dependencies between the frames types communicated over an HSSL channel according to an example. In this regard, FIG. 1*n* shows an example in which, for a channel in a target role, there may be cross-dependencies between a command frame arrival and the triggering of an ACK or NACK frame for a channel. Each command frame received with correct CRC of types write, stream, or trigger frame may result in either an ACK or a NACK—i.e. target error—response frame. Each read frame received with correct CRC will result either in a data frame—i.e. read response frame—or in a NACK frame.

Moreover, generating a response frame may involve copying the transaction tag of the command frame into the response frame. The response frame may be triggered by the SRI master 260 signaling either a successful SRI bus transaction or an SRI bus error. In the example, only a trigger command frame may trigger an immediate acknowledge because it typically results in an interrupt flag being set, and not in a bus transaction.

In contrast to the above, FIG. 1*o* shows that on the initiator side, there may be a forward looking cross dependency between a command frame and the expected response. Setting an initiator request flag Ix for a certain command may be accompanied in parallel with the following activities:

Namely, capturing the current transaction tag in the bit field ICONx (x=0-3).CETT, generating the next transaction tag by incrementing a three bit counter per channel, the ICONx (x=0-3).ITTAG, starting the corresponding timeout counter at the moment when the command wins the arbitration, and setting the corresponding expect tag Ex indicating that the timeout is running and a response frame is expected.

Figure 1P:
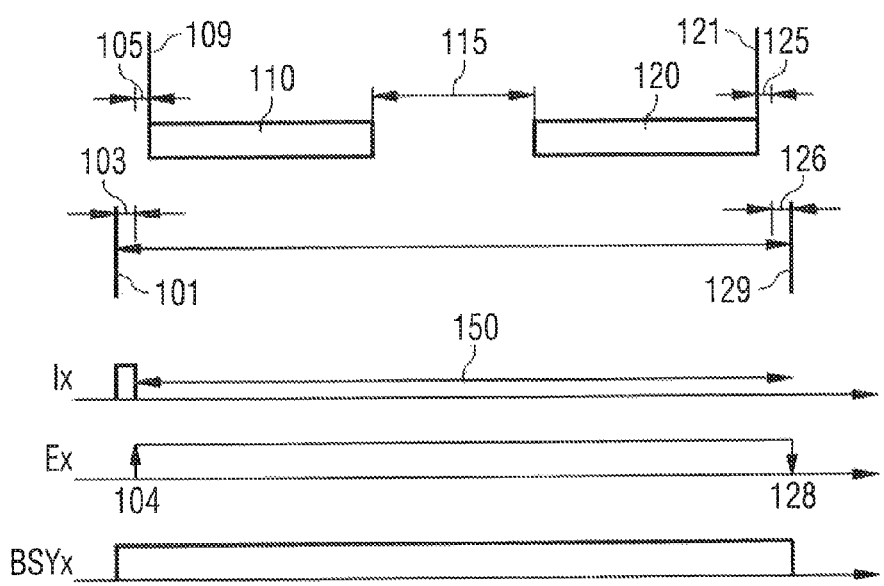
FIG. 1p shows a schematic overview of events, processes, delays and signal sequences in a command timeout measurement for command according to an embodiment.

The following part of the description relates to command protection via command timeouts. In this regard, FIG. 1p shows a schematic overview of events, processes, delays and signal or flag sequences in a command timeout measurement according to an embodiment. Specifically, the upper half of FIG. 1p shows that at a first instant in time 101 a channel may start to deliver a command.

After an initial delay 103 and a first delay 105 of the physical and data layer module—i.e. the HSCT module—at a second instant in time 109, a command transmission may be started by sending a command frame 110 over the channel. A deactivation of a clear to send input of the HSSL module during the time period of the initial delay 103 may stop the transmission in this phase.

Furthermore, after a response delay 115, a response frame 120 to the command frame 110 may be transmitted over the channel to acknowledge the correct receipt of the command frame 110. The corresponding response transmission may end at a third instant in time 121.

After a second delay 125 of the HSCT module and an end delay 126, the channel may complete to receipt of the response to the command at a fourth instant in time 129.

The lower half of FIG. 1 shows signal sequences of predetermined flags which may trigger the start and stop of a timeout timer. As before, the wildcard "x" in a flag identifier designates the fact that the corresponding flag refers to any one of a set of predetermined channels, for instance, channels "0", "1", "2", "3" and a streaming channel "s".

From the point of view of the expect flag Ex, the timeout may start with the rising edge 104 of the expect flag Ex and may end with its falling edge 128. The expect flag Ex may be set by the falling edge of the initiator request flag Ix for the corresponding command, which may be reset when said command request wins the transmit arbitration. During the time interval 150, the corresponding request flag Ix may be disabled for being set again.

If the response frame 120 corresponding to the command frame 110 has not arrived and the timeout timer reaches zero, the timeout timer may be stopped, a timeout error may be triggered and the expect flag Ex may be cleared.

In other words and to summarize, the corresponding timeout timer may be started when the command frame 110 wins the transmit arbitration and may be delivered by the channel for transmission. The timeout timer may be stopped if the appropriate response frame 120 has arrived in time without a CRC error.

The following part of the description relates to command timeout operation of an embodiment. In this embodiment, the HSSL module may comprise a prescaler as shown in FIG. 1f, i.e. a predivider for the clock signal, common to all channels, and one channel specific timeout timer block per channel.

An embodiment of a single timeout timer block is shown in FIG. 3. The transaction tag for the corresponding channel 305 and for its timeout timer block 300 may be generated by a functional New TTAG block 320. This may be done by incrementing a three bit counter. Moreover, the timeout reload value, i.e. the duration of the timeout in units of the prescaled clock periods, may be defined for the timeout timer block 300 by a functional TOREL block 310.

Based on this definition by the functional TOREL block 310, an actual timeout timer 350 may be reloaded by a functional reload block 340 and triggered to start downcounting when a command transmission process starts. The functional reload block 340 in turn is triggered to do so by the transmit arbiter block 330.

Furthermore, the timeout timer block 300 may capture the current transaction tag by a functional capture block 360. The current transaction tag may be compared with the transaction tag of the arrived response by a functional compare block 370.

In the embodiment as shown in FIG. 3, the transaction tag of the arrived response may be determined by a functional RXTTAG block 380. The determination of the transaction tag of the arrived response by the functional RXTTAG block 380, the comparison of the current transaction tag by the functional compare block 370, and in case of a positive comparison, the stop of the timeout timer 350 may all be triggered by the receive distributor block 390.

Moreover, a functional continuous compare block 375 of the timeout timer block 300 may determine if the current value of the timeout timer 350 has reached zero.

If so—i.e. in case of a timeout error—or in case of an erroneous CRC for a corresponding frame, the timeout timer block 300 may generate a timeout signal.

The current value of the timeout timer 350 may be indicated in a bit field ICON.TOCV, and the timeout reload value may be configured in a bit field ICON.TOREL. The currently expected transaction tag may be indicated in a bit field ICON.CETT and the captured value of the latest erroneous transaction tag may be indicated in a bit field ICON.LETT.

The following part of the description relates to an extended stream timeout functionality for stream channels. Specifically, an embodiment for parallel timeout monitoring of stream commands is described wherein the streams commands may be initiated by corresponding stream command frames.

Figure 4:
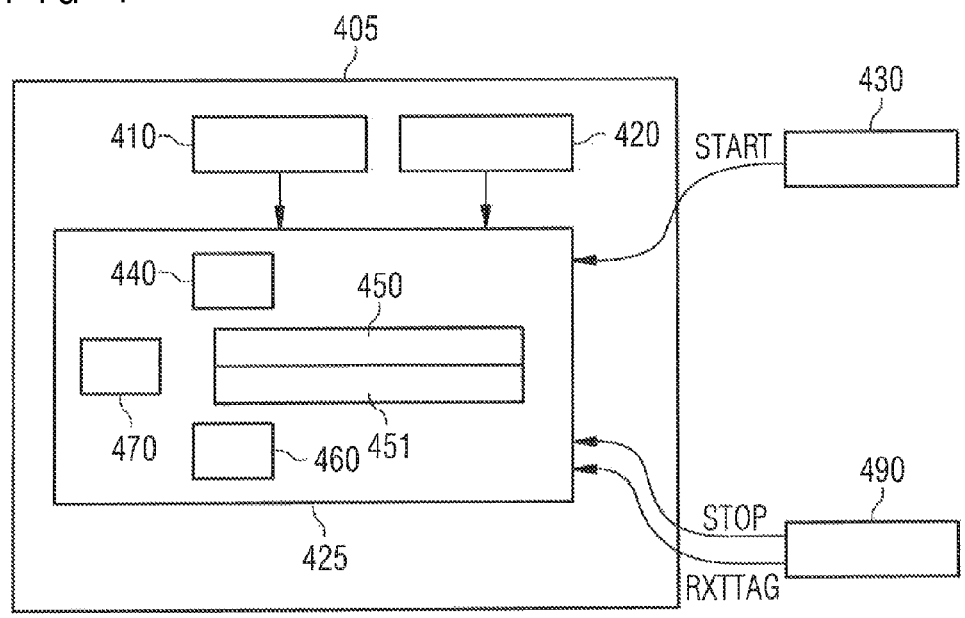
FIG. 4 shows a timeout functional block for stream timeout functionalities according to an embodiment.

In this regard, FIG. 4 shows an embodiment of a stream timeout timer block 425 for a stream channel 405.

Similar to the embodiment of a simple channel timeout timer block in FIG. 3 for monitoring simple command frames, there may be a functional New TTAG block 420 to generate the transaction tag for the corresponding stream channel 405 and its stream timeout timer block 425.

Moreover, the timeout reload value, i.e. the duration of the timeout in units of the prescaled clock periods, may be defined for the stream timeout timer block 425 by a corresponding functional TOREL block 410.

In operation, a free, i.e. non-active, timeout timer of two timeout timer blocks 450, 451 of the stream timeout timer block 425 may be started when a stream frame wins an arbitration round and is delivered by the stream channel 405 for transmission. The start of the free timeout timer of the two timeout timer blocks 450, 451 may be triggered by the transmit arbiter block 430.

Moreover, a predetermined one of the two timeout timer blocks 450, 451 may be reset to zero and stopped if a corresponding response frame has arrived in time without a CRC error. The stop of the predetermined one of the two timeout timer blocks 450, 451 may be triggered by the receive distributor block 490. Moreover, the receive distributor block 490 may signal the transaction tag RXTTAG of the arrived response to the stream timeout timer block 425.

If a response with an appropriate transaction tag RXTTAG has not arrived, a timeout error may be triggered and the corresponding one of the two timeout timer blocks 450, 451 may be reset.

The stream initiator may keep track of the expected acknowledges by a virtual expect FIFO of the stream timeout timer block 425 having a virtual filling level EXFL 470. Each new stream frame transmission may increment the EXFL 470, whereas receiving a correct acknowledge may decrease the EXFL 470.

As long as the expect FIFO is full—i.e. at virtual filling level of two in the present embodiment of FIG. 4—no new transmit request may be issued. In order that a new stream frame request may be issued, which means that the flag IS should be set by the module, three conditions should be met, namely the expect level should be below two (EXFL<2), the TXFIFO should not be empty (TXFL>0) and the LSB bit should have been set by the software (LSB=1).

In the following, the further stream timeout operation is described. In this regard, the stream channel 405 may monitor the arrivals of the stream frame responses via the receive distributor block 490 by using the two timeout timer blocks 450, 451. In an embodiment, the two timeout timer blocks 450, 451 may be configured similar to the single timeout timer block 300 shown in FIG. 3.

The new initiator TTAG value as defined by the functional New TTAG block 420 and as used for the next frame may be visible in the bit field ICONx.ITTAG. The ICONx register may also comprise the TOREL and the TOCV bit fields.

The streaming functionality may use two timers of the two timeout timer blocks 450, 451 sharing the same reload value, as defined by the functional TOREL block 410 and the bit field ICON2.TOREL. In the embodiment of FIG. 4, the two timeout timer blocks 450, 451 may simulate the behavior of a FIFO, namely the above-mentioned expect FIFO, by comprising additionally a "write" pointer 440 and a "read" pointer 460.

The transmit or "write" pointer 440 may point to the timer block where the next command frame will trigger the writing of the timeout reload value and the transaction tag.

In contrast to that, the receive or "read" pointer 460 may point to the block which performs the transaction tag comparison with the TTAG of the currently arrived stream acknowledge.

Correspondingly, the EXFL 470 or virtual filling level may indicate how many timers of the two timeout timer blocks 450, 451 are active, such as e.g. zero, one or two. The EXFL 470 may be visible in a SFSFLAGS register of the HSSL module.

FIG. 5 shows an example transmission of three stream frames SF1, SF2 and SF3 and corresponding stream timeout measurements by a stream timeout timer block according to an embodiment as depicted in FIG. 4. In this regard, the upper half of FIG. 5, shows the temporal duration of said stream frames SF1, SF2 and SF3 as represented by the corresponding horizontal bars.

In the embodiment of FIG. 5, the first stream frame SF1 may be acknowledged by a first acknowledge frame ACK1 after a first response delay 540. Accordingly, the second stream frame SF2 is acknowledged by a second acknowledge frame ACK2 after a second response delay 550.

In the lower half of FIG. 5, value sequences of the initiator request flag IS of the corresponding stream channel, of the expect FIFO filling level EXFL and of the transmit FIFO filling level TXFL are shown which correspond to beginnings and ends of the three stream frames SF1, SF2 and SF3 in the upper half.

With respect to the initiator request flag IS, FIG. 5 shows that the transmission of the first stream frame SF1 may be started when the initiator request flag IS is reset for the first time.

As a result of the start of the transmission of the first stream frame SF1, the transmit FIFO filling level TXFL may be reduced from 2 to 1, indicating that there is one stream frame less to transmit. At the same time, the expect FIFO filling level EXFL may be increased from 0 to 1, indicating that there is one response frame expected after a successful transmission of the first stream frame SF1.

Since the expect FIFO filling level EXFL is below the predetermined tracking limit for stream frames of two, the initiator request flag IS may be set by the next stream frame to transmit in the transmit FIFO shortly after the initiator request flag IS has been reset for the first time.

However, the initiator request flag IS remains set and may only be reset for the second time to start the transmission of the second stream frame SF2 after the transmission of the first stream frame SF1 has finished.

The start of the transmission of the second stream frame SF2 may decrease the transmit FIFO filling level TXFL from 2 to 1, indicating that there is again one stream frame less to transmit. At the same time, the expect FIFO filling level EXFL may be increased again from 1 to 2, indicating that there are two response frames expected indicating the successful transmission of the first stream frame SF1 and the second stream frame SF2 since the first stream frame SF1 has not been acknowledged yet at the beginning of the transmission of the second stream frame SF2.

Since the expect FIFO filling level EXFL equals the predetermined tracking limit for stream frames of two, the initiator request flag IS may not be set by the next stream frame to transmit in the transmit FIFO until the first acknowledge frame ACK1 has been received completely to acknowledge the correct receipt of the first stream frame SF1. Correspondingly, the initiator request flag IS may not be set during the interval 560 between the start of the transmission of the second stream frame SF2 and the complete receipt of the first acknowledge frame ACK1 for the first stream frame SF1.

After the complete receipt of the first acknowledge frame ACK1 for the first stream frame SF1, the initiator request flag IS may be set for the third time. The initiator request flag IS then may remain set and may only be reset for the third time to start the transmission of the third stream frame SF3 after the transmission of the second stream frame SF2 has finished.

The start of the transmission of the third stream frame SF3 may decrease the transmit FIFO filling level TXFL from 2 to 1, indicating that there is again one stream frame less to transmit. At the same time, the expect FIFO filling level EXFL may be increased again from 1 to 2, indicating that there are two response frames expected indicating the successful transmission of the second stream frame SF2 and the third stream frame SF3 since the second stream frame SF2 has not been acknowledged yet at the beginning of the transmission of the third stream frame SF3.

Since the expect FIFO filling level EXFL then equals the predetermined tracking limit for stream frames of two again, the initiator request flag IS may not be set by the next stream frame to transmit in the transmit FIFO until the second acknowledge frame ACK2 has been received completely to acknowledge the correct receipt of the second stream frame SF2. Correspondingly, the initiator request flag IS may not be set during the interval 570 between the start of the transmission of the third stream frame SF3 and the complete receipt of the second acknowledge frame ACK2 for the second stream frame SF2.

With respect to the above-described embodiments which relate to the Figures, it is emphasized that said embodiments basically served to increase the comprehensibility. In addition to that, the following further embodiments try to illustrate a more general concept. However, also the following embodiments are not to be taken in a limiting sense. Rather—as expressed before—the scope of the present invention is defined by the appended claims.

In this regard, a first embodiment relates to a system for protecting a plurality of communication channels with a timeout comprising a plurality of timeout timers. In this system, each one of the plurality of timeout timers is assigned to a corresponding one of the plurality of communication channels.

In one embodiment, each one of the plurality of timeout timers is individually configurable to a corresponding one of a plurality of timer specific timeout periods.

In another embodiment, each one of said plurality of timer specific timeout periods is set to a corresponding one of a plurality of optimal timeout periods specific to the corresponding one of the plurality of communication channels. At least also in the previous two embodiments, the timeout periods may be specified in prescaled clock periods.

In a further embodiment, each one of the plurality of timeout timers is adapted to be started by a corresponding one of a plurality of command frames winning an arbitration for transmission and being delivered by a corresponding one of the plurality of communication channels for transmission. However, in alternative embodiments, the start of the timeout timer may also be triggered by other events such as a transmit request, the start of the transmission of a command frame, the end of the transmission of a command frame or other suitable events.

In still one further embodiment, each one of the plurality of timeout timers is adapted to be stopped by a corresponding one of a plurality of expected response frames arriving in time without a cyclic redundancy check, CRC, error. However, in alternative embodiments, the stop of the timeout timer may already be triggered by the simple receipt of a response. The conditions if no CRC error occurred, if the transaction tag matches the one of the expected response, and if the correct response was received represent further triggering conditions that might be checked in any combination to alternatively trigger the stop of the timeout timer.

A further embodiment relates to a system for monitoring pipelined command executions started by predetermined command frames. This system is adapted to receive said predetermined command frames and corresponding acknowledge frames.

Said system comprises a write pointer, a read pointer, and at least two timeout timer blocks. The at least two timeout timer blocks are configured to simulate a FIFO behavior.

The FIFO behavior is simulated by the write pointer being adapted to select and start a next non-active timeout timer of the at least two timeout timer blocks when one of the predetermined command frames is to be transmitted.

Furthermore, the FIFO behavior of the at least two timeout timer blocks is simulated by the read pointer being adapted to select and stop a predetermined active timeout timer of the least two timeout timer blocks on receipt of the acknowledge frame corresponding to the one of the predetermined command frames which started the predetermined timeout timer. Also in this embodiment, the conditions if no CRC error occurred, if the transaction tag matches the one of the expected response, and if the correct response was received may be checked in any combination to alternatively trigger the stop of the timeout timer.

In one embodiment, the write pointer is adapted to point to that timeout timer block of the at least two timeout timer blocks where a next one of the predetermined command frames to be transmitted will write a timeout reload value, TOREL, and a transaction tag, TTAG, of said received one of the predetermined command frames to start the corresponding timeout timer.

In another embodiment, the read pointer is adapted to point to that timeout timer block of the at least two timeout timer blocks whose stored transaction tag is compared with a transaction tag of a currently received one of the acknowledge frames to stop the corresponding timeout timer.

Another embodiment further comprises an indicator for a virtual filling level, named Expect FIFO Filling Level, short EXFL, indicating how many of the at least two timeout timer blocks are active.

In one embodiment, said timeout reload value defines a duration of a timeout period in units of prescaled clock periods.

A still further embodiment relates to a system for parallel timeout monitoring of stream commands initiated by corresponding stream command frames, i.e. write command frames respectively comprising a data block of predetermined length.

This system comprises a plurality of timeout timers, a write pointer adapted to select and start a next non-active timeout timer of the plurality of timeout timers when one of said stream command frames is to be transmitted.

Moreover, said system comprises a read pointer adapted to select and stop a predetermined active timeout timer of the plurality of timeout timers on receipt of an acknowledge frame corresponding to the one of said stream command frames which started the predetermined timeout timer.

In an embodiment, a timeout reload value defines a duration of a timeout period of one of the plurality of timeout timers.

In one embodiment, the plurality of timeout timers share the same timeout reload value.

In another embodiment, the stream command frames each comprise a data block of 256-bit length.

A further embodiment relates to a method for protecting a plurality of communication channels with a timeout comprising assigning each one of a plurality of timeout timers to a corresponding one of the plurality of communication channels.

An embodiment of said method further comprises individually configuring each one of the plurality of timeout timers to a corresponding one of a plurality of timer specific timeout periods.

In another embodiment, individually configuring comprises setting each one of said plurality of timer specific timeout periods to a corresponding one of a plurality of optimal timeout periods specific to the corresponding one of the plurality of communication channels.

An embodiment of the method further comprises starting each one of the plurality of timeout timers by a corresponding one of a plurality of command frames winning an arbitration for transmission and being delivered by a corresponding one of the plurality of communication channels for transmission.

Another embodiment of the method further comprises stopping each one of the plurality of timeout timers by a corresponding one of a plurality of expected response frames arriving in time without a cyclic redundancy check, CRC, error.

A further embodiment relates to a method for parallel timeout monitoring of concurrently executed commands comprising assigning or de-assigning each one of said commands to a corresponding one of a plurality of timeout timers in a FIFO manner when corresponding commands are to be transmitted or command acknowledges are received respectively.

An embodiment of the method further comprises using a virtual expect FIFO to track expected ones of said command acknowledges.

In an embodiment, the virtual expect FIFO comprises a virtual filling level, EXFL, wherein each new one of said commands increases the virtual filling level and each correctly received one of said command acknowledges decreases the virtual filling level.

In one embodiment, no further one of said commands is assigned to a corresponding one of the plurality of timeout timers if the virtual filling level of the virtual expect FIFO exceeds a predetermined tracking limit.

A further embodiment relates to a method for parallel timeout monitoring of concurrent stream commands. This method comprises a step of using a write pointer to select and start a next non-active timeout timer of a plurality of timeout timers when one of said stream commands is to be transmitted. In a further step, a read pointer is used to select and stop a predetermined active timeout timer of the plurality of timeout timers on receipt of a command acknowledge corresponding to the one of said stream commands which started the predetermined timeout timer.

A still further embodiment relates to a method for timeout monitoring of concurrent commands or parallel communication channels comprising assigning or de-assigning each one of said commands or communication channels to a corresponding one of a plurality of timeout timers when corresponding commands are to be transmitted or command acknowledges are received respectively.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
at least one microcontroller for monitoring pipelined command executions started by predetermined command frames, the microcontroller comprising:
 a processor configured to execute instructions in a memory storing:
  a write pointer;
  a read pointer; and
  at least two timeout timer blocks configured to simulate a FIFO behavior in that:
   the write pointer is configured to select and start a next non-active timeout timer of the at least two timeout timer blocks when one of the predetermined command frames is to be transmitted; and
   the read pointer is configured to select and stop a predetermined active timeout timer of the least two timeout timer blocks on receipt of an acknowledge frame corresponding to the one of the predetermined command frames which started the predetermined timeout timer;
 wherein the write pointer is further configured to point to that timeout timer block of the at least two timeout timer blocks where a next one of the predetermined command frames to be transmitted will write a timeout reload value and a transaction tag of the received one of the predetermined command frames to start the corresponding timeout timer.

2. The system of claim 1, wherein the read pointer is configured to point to that timeout timer block of the at least two timeout timer blocks whose stored transaction tag is compared with a transaction tag of a currently received one of the acknowledge frames to stop the corresponding timeout timer.

3. The system of claim 1, further comprising an indicator for a virtual filling level named Expect FIFO Filling Level (EXFL) indicating how many of the at least two timeout timer blocks are active.

4. The system of claim 1, wherein the timeout reload value defines a duration of a timeout period in units of prescaled clock periods.

5. A system for parallel timeout monitoring of stream commands initiated by corresponding stream command frames respectively comprising a data block of predetermined length, the system comprising:
 one or more microcontrollers comprising:
  a processor configured to execute instructions in a memory storing:
   a plurality of timeout timers;
   a write pointer configured to select and start a next non-active timeout timer of the plurality of timeout timers when one of the stream command frames is to be transmitted; and
   a read pointer configured to select and stop a predetermined active timeout timer of the plurality of timeout timers on receipt of an acknowledge frame corresponding to the one of the stream command frames which started the predetermined timeout timer;
 wherein the write pointer is further configured to point to that timeout timer block of a plurality of timeout timer blocks where a next one of the stream command frames to be transmitted will write a timeout reload value and a transaction tag of a received one of the stream command frames to start the corresponding timeout timer.

6. The system of claim 5, wherein the timeout reload value defines a duration of a timeout period of one of the plurality of timeout timers.

7. The system of claim 6, wherein the plurality of timeout timers share the same timeout reload value.

8. The system of claim 5, wherein the stream command frames each comprise a data block of 256-bit length.

* * * * *